United States Patent
Rossetto et al.

(10) Patent No.: US 11,638,498 B2
(45) Date of Patent: May 2, 2023

(54) FILTER FOR A FILTER HOLDER CUP OF A COFFEE MACHINE

(71) Applicant: De'Longhi Appliances S.R.L., Treviso (IT)

(72) Inventors: Giovanni Rossetto, Treviso (IT); Maurizio Casasola, Treviso (IT)

(73) Assignee: De'Longhi Appliances S.r.L., Treviso (IT)

( * ) Notice: Subject to any disclaimer, the term of this patent is extended or adjusted under 35 U.S.C. 154(b) by 394 days.

(21) Appl. No.: 16/927,064

(22) Filed: Jul. 13, 2020

(65) Prior Publication Data
US 2021/0022542 A1    Jan. 28, 2021

(30) Foreign Application Priority Data
Jul. 22, 2019    (IT) .................. 102019000012573

(51) Int. Cl.
*A47J 31/06* (2006.01)
*A47J 31/36* (2006.01)

(52) U.S. Cl.
CPC ....... *A47J 31/0663* (2013.01); *A47J 31/0684* (2013.01); *A47J 31/3609* (2013.01); *A47J 31/3671* (2013.01)

(58) Field of Classification Search
CPC .... A47J 31/42; A47J 31/0626; A47J 31/0663; A47J 31/3609; A47J 31/3671

USPC ........................................ 99/302 R
See application file for complete search history.

(56) References Cited

U.S. PATENT DOCUMENTS

| 5,150,645 A | * | 9/1992 | Schiettecatte ....... | A47J 31/4496 99/295 |
| 2006/0174770 A1 | * | 8/2006 | Jordana ............... | A47J 31/0605 99/279 |
| 2008/0115675 A1 | * | 5/2008 | Suggi Liverani ... | A47J 31/0663 99/289 R |
| 2014/0090565 A1 | * | 4/2014 | Yang ................... | A47J 31/0663 99/323 |

FOREIGN PATENT DOCUMENTS

| EP | 1319357 A3 | * | 12/2003 | .......... A47J 31/0605 |
| WO | WO-2011097831 A1 | * | 8/2011 | .......... A47J 31/0663 |

* cited by examiner

*Primary Examiner* — Reginald Alexander
(74) *Attorney, Agent, or Firm* — Blank Rome LLP

(57) ABSTRACT

The filter (6, 13) for a filter holder cup (2) of a coffee machine, including a cup body (6) having a bottom wall (7) provided with a dispensing hole (8) for dispensing infused coffee and a side wall (9) that bounds a compartment (10) with the bottom wall (7), inside the compartment (10) a separating filtering wall (13) being further positioned between an upper housing chamber (14) housing coffee powder and a lower dispensing chamber (15) for dispensing the infused coffee including said dispensing hole (8), inside said dispensing chamber (15) a filtering element (17) is provided to protect said dispensing hole (8).

10 Claims, 2 Drawing Sheets

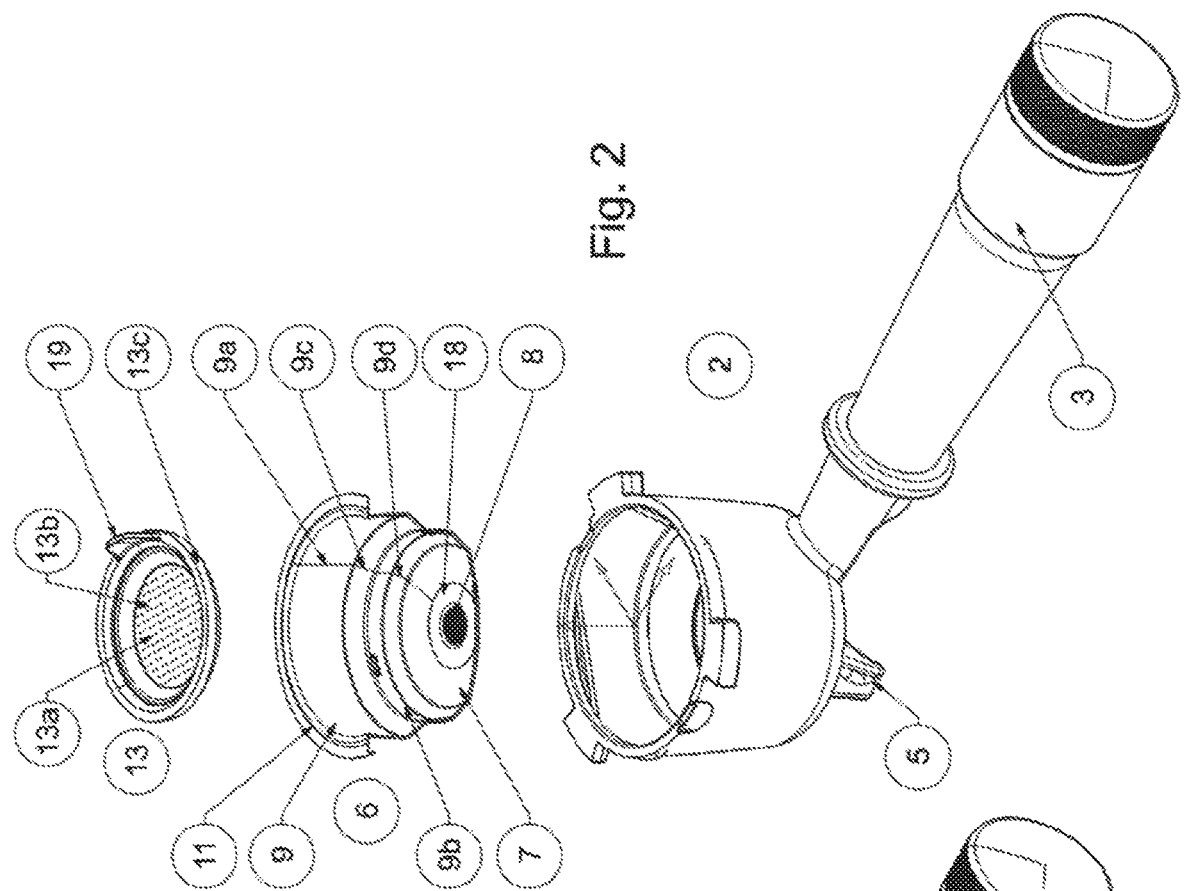
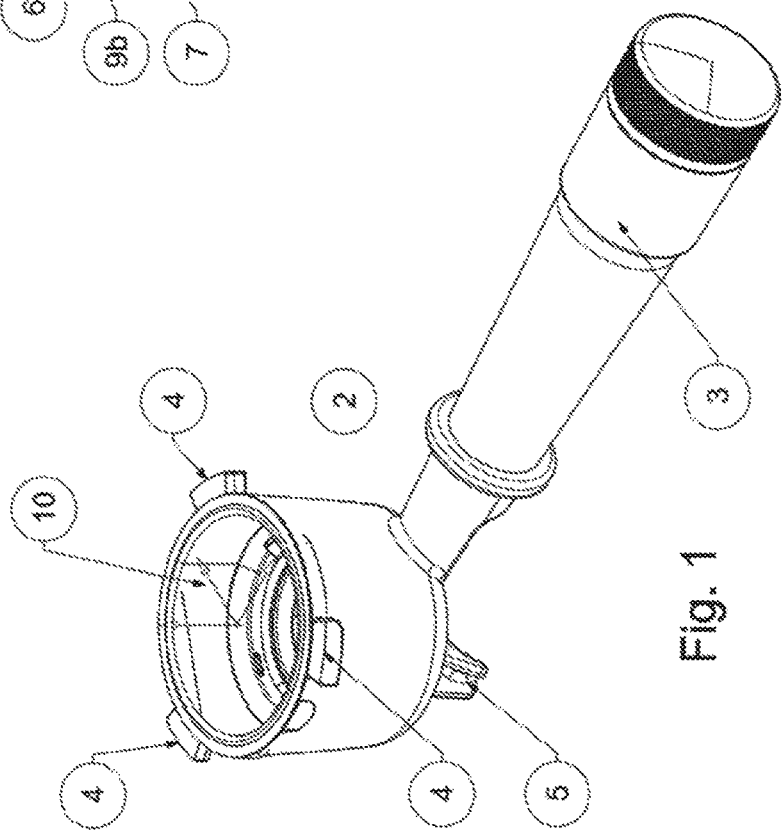

FILTER FOR A FILTER HOLDER CUP OF A COFFEE MACHINE

RELATED APPLICATIONS

This application claims benefit of priority of Italy Application No. 102019000012573, filed Jul. 22, 2019. The above-identified related application is incorporated by reference.

FIELD OF USE

The present invention relates to a filter for a filter holder cup of a coffee machine, particularly to a so-called double-wall filter.

BACKGROUND OF THE INVENTION

A filter of this type comprises a cup-shaped body having a bottom wall with a dispensing hole for dispensing infused coffee and a side wall that bounds a compartment with the bottom wall inside which a filtering wall provided with a plurality of through holes is positioned. The filtering wall separates an upper housing chamber housing the coffee powder from a lower dispensing chamber for dispensing the infused coffee.

The calibrated holes of the filtering wall retain the coffee powder but let through the infused coffee.

The filtering wall in some already known solutions of the filter is irremovable.

However, this causes the performance of the filter to deteriorate rapidly because of the progressive accumulation of impurities and incrustations in the lower dispensing chamber of the infused coffee that lead to the progressive obstruction of the dispensing hole.

This can adversely affect the hygienic conditions of the filter and the organoleptic features of the infused coffee.

In order to overcome this drawback, a filter structure with a removable filtering wall has been proposed to permit access to the dispensing chamber so as to be able to inspect and clean the inside of the dispensing chamber.

In this case in particular the filtering wall is perimetrally provided with a gasket that forms a seal with the cup-shaped body to prevent the coffee powder entering the dispensing chamber.

Also this solution has some drawbacks.

On the one hand, the continuous removal of the filtering wall may involve damaging the seal gasket that is no longer able to stop the particles of coffee powder, which thus tend to deposit in the dispensing chamber and encrust the dispensing hole.

On the other hand, cleaning of the filter after the filtering wall has been removed is often not performed properly with the inevitable result that some residues may remain inside the dispensing chamber.

SUMMARY OF THE INVENTION

The technical task of the present invention is, therefore, to provide a filter for a filter holder cup of a coffee machine which obviates the technical drawbacks described above of the prior art.

Within the scope of this technical task, one object of the invention is to provide a filter holder cup of a coffee machine that has been adapted to prevent the dispensing hole possibly getting clogged.

Another object of the invention is to make a filter for a filter holder cup of a coffee machine that ensures long-term efficiency and maintenance of the necessary hygienic conditions to thus promote the dispensing of a coffee infusion with the desired organoleptic properties.

Another object of the invention is to make a filter for a filter holder cup of a coffee machine that is easy to clean.

Not the least important object of the invention is to make a filter for a filter holder cup of a coffee machine that is constructionally simple and cheap.

The technical task and these and other objects according to the present invention are attained by making a filter for a filter holder cup of a coffee machine, comprising a cup body having a bottom wall provided with a dispensing hole for dispensing infused coffee and a side wall that bounds a compartment with said bottom wall, inside said compartment a separating filtering wall being further positioned between an upper housing chamber housing coffee powder and a lower dispensing chamber for dispensing the infused coffee comprising said dispensing hole, characterized in that inside said dispensing chamber a filtering element protecting said dispensing hole is provided.

Said filtering wall has a plurality of through holes calibrated for the selective transition of the infused coffee.

Advantageously, said filtering element engages sealingly with said bottom wall along a closed line circumscribing said dispensing hole.

Advantageously, said filtering element divides said lower dispensing chamber into a storage subchamber for storing unfiltered infused coffee and a dispensing subchamber for dispensing filtered infused coffee comprising said dispensing hole.

In one preferred embodiment of the invention, said filtering element has a wall provided with a plurality of through holes.

In one preferred embodiment of the invention said wall provided with a plurality of through holes of said filtering element overlaps at a distance said dispensing hole.

Advantageously, the holes of said wall of said filtering element are smaller than said holes of said filtering wall.

In one embodiment of the invention, said filtering wall has a perimeter gasket engaging removably with said cup-shaped body.

In a further embodiment of the invention said filtering wall is fixed permanently to said cup body.

In one embodiment of the invention said filtering element is fixed to said filtering wall.

In another preferred embodiment of the invention said filtering element is fixed to said cup-shaped body.

The present invention also refers to a filter holder cup that incorporates this filter and to a coffee machine that incorporates such a filter holder cup.

The present invention thus provides a filter with an extremely simple construction because it has a monolithic structure or can be at most dismantled into two pieces.

If the filtering wall is removable, cleaning is also simplified because the dispensing chamber can be accessed in an extremely simple way, the dispensing chamber being formed between the bottom wall of the cup-shaped body and the filtering wall.

In all cases, the present invention provides a filter that prevents obstruction of the dispensing hole, which is carefully calibrated with dimensions such as to permit significant acceleration of the flow of infused coffee so as to generate a significant increase in the turbulence induced in the flow and thus greater mixing of air in the infused coffee with a consequent formation of coffee cream or foam.

Other features of the present invention are further defined in other dependent claims.

The filter according to the invention adds to the normally provided filtering wall a further and more effective barrier that prevents the particles of coffee powder that have managed to pass through the filtering wall to reach and clog the dispensing hole.

BRIEF DESCRIPTION OF THE DRAWINGS

Further characteristics and advantages of the invention will more fully emerge from the description of a preferred but not exclusive embodiment of the filter according to the invention, illustrated by way of non-limiting example in the appended drawings, wherein:

FIG. 1 shows a perspective view of the filter holder cup with the filter in position;

FIG. 2 shows a perspective view of the filter holder cup with the filter removed and exploded;

DETAILED DESCRIPTION OF THE ILLUSTRATED EMBODIMENTS

Figure 5:
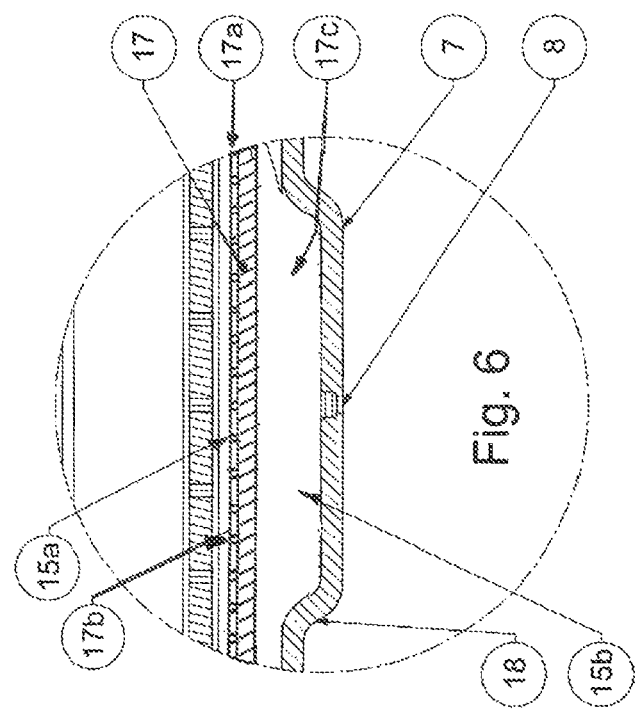
FIG. 5 shows a side elevation of the filter sectioned along a vertical middle plane.
Figure 4:
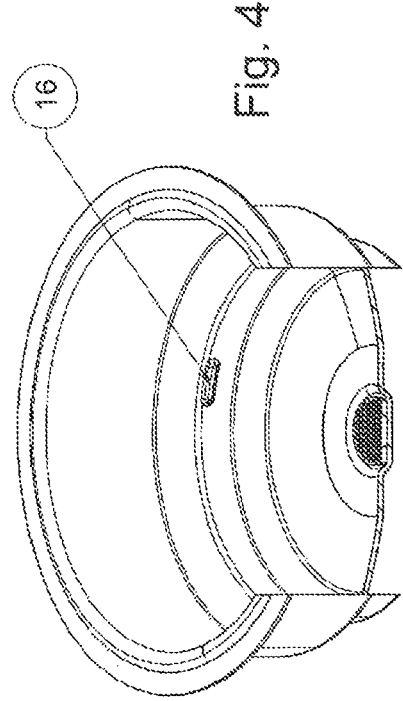
FIG. 4 shows a perspective top view of the sectioned cup-shaped body of FIG. 3.
Figure 3:
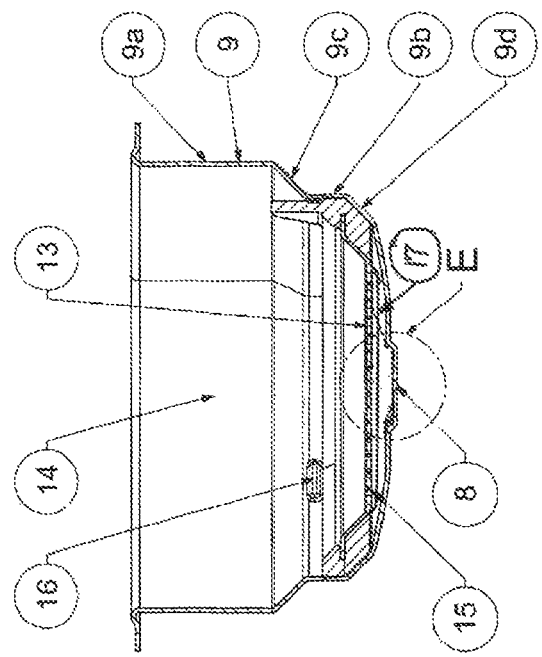
FIG. 3 shows a top plan view of the cup-shaped body of the filter provided with the filtering element.

With reference to the cited figures, a filter 13, 6, is shown said filter being housable in a filter holder cup 2 of a coffee machine, particularly of an espresso coffee machine in which, in the beverage production step, the filter is traversed by a flow of hot water that can reach 8-10 bar pressure.

The filter holder cup 2 has as is known a grip 3, bayonet-fixing connecting flaps 4 in a housing provided in the coffee machine, and one or more dispensing spouts 5 of the infused coffee.

The connecting flaps 4 extend outside the upper mouth of the filter holder cup 2, whereas the spouts 5 extend outside from the bottom of the filter holder cup 2.

The filter holder cup defines the removable infusion end-piece of an infusion circuit having inside the coffee machine a water supply pump and a water boiler positioned between the supply pump and the infusion end-piece.

Obviously, the invention embraces filter holder cups with a conformation and connection system that are different from the illustrated conformation and connection system, for example a connection system that provides sliding linear guides for engaging in the housing provided in the coffee machine.

The filter 13, 6 comprises a cup-shaped body 6 having a bottom wall 7 provided with a dispensing hole 8 for dispensing infused coffee and a side wall 9 that extends from the perimeter edge of the bottom wall 8 and bounds a compartment 10 with the bottom wall 8.

The cup-shaped body 6 has an upper mouth provided on the perimeter with an outer resting collar 11 along the perimeter edge of yoked upper mouth of the filter holder cup 2.

In the illustrated solution, the side wall 9 of the cup-shaped body 6 is formed by a length of upper cylinder 9a of greater diameter, a length of lower cylinder 9b of lesser diameter, a first perimeter connection 9c connecting the length of upper cylinder 9a and the length of lower cylinder 9b, a second perimeter connection 9d connecting the length of lower cylinder 9b and the bottom wall 7.

The cup-shaped body 6 is preferably made by moulding a single metal sheet.

The filter 13, 6 further comprises, inside the compartment 10, a separating filtering wall 13 between an upper chamber 14 housing the coffee powder and a lower dispensing chamber 15 for dispensing the infused coffee comprising the dispensing hole 8.

The filtering wall 13 has a plurality of calibrated through holes 13a to let through the infused coffee but not the particles of coffee powder.

The filtering wall 13 comprises in particular a drilled sheet 13b, for example a metal plate that is flat, concave, convex or of any other shape.

In the illustrated solution, the filtering wall 13 has a perimeter gasket 13c removably engaging with the cup-shaped body 6.

In particular, the perimeter gasket 13c has a shape joined to the side wall 9 of the cup-shaped body 6 and engages sealingly with the latter to prevent any transit of liquid or particles of coffee powder through the reciprocally engaging surfaces.

More precisely, the second connection 9d of the side wall 9 of the cup-shaped body 6 has a vertical frustoconical shape that is tapered from top to bottom and the gasket 13c has a rectangular trapezium cross section the lesser base of which mates with the lower cylindrical length 9b of the side wall 9 of the cup-shaped body 9 and the oblique side mates with the second connection 9d of the side wall 9 of the cup-shaped body 6.

In order to lock firmly in position the filtering wall 13, the side wall 9 of the cup-shaped body 6, and in particular the length of lower cylinder 9b, has internally one or more engaging protrusions 16 for the upper perimeter edge of the perimeter gasket 13c.

The thickness of the protrusions 16 is such as to interfere with the gasket 13c to generate a slight deformation of the gasket 13c during positioning and removal of the filtering wall 13.

In one solution that is not shown the filtering wall 13 can be permanently fixed to the cup-shaped body 6.

In this case, the sealing perimeter gasket can be provided in any case or the drilled sheet can be connected directly to the cup body 6.

The gasket 13c can be associated with the drilled sheet 13b by overinjection of elastomeric material. Preferably, the elastomeric material is based on food grade silicone. This feature enables a stable and durable association to be made between the gasket and the filtering wall at the same time as the effective creation of the seal.

The gasket 13c can be alternatively fixed to the drilled sheet 13 by atoxic adhesive substances, or by mechanical joining means.

If the filtering wall 13 is removable, the filter can comprise, as shown, a gripping element 19 for separating the filtering wall 13 from the cup-shaped body 6.

The gripping element 19 can comprise a tab that protrudes from the gasket 13c, that is made during the step of overinjecting the gasket 13c onto the drilled sheet 13b.

The gripping element 19 can alternatively be a distinct and separate element that can be connected by gluing or other mechanical means to the filtering wall 13.

Advantageously, a filtering element 17 protecting the dispensing hole 8 is provided inside the dispensing chamber 15.

The filtering element 17 engages sealingly with the bottom wall 7 of the cup-shaped body 6 along a closed line circumscribing the dispensing hole 8.

The filtering element 17 divides the lower dispensing chamber 15 in a storage subchamber 15a for storing the unfiltered infused coffee and a dispensing subchamber 15b of the filtered infused coffee.

The dispensing subchamber 15b of the filtered infused coffee comprises the dispensing hole 8.

The filtering element 17 has at least one wall 17a having holes 17b smaller than the holes 13a of the filtering wall 13, which are in turn smaller than the dispensing hole 8.

For example, the holes 17b of the filtering element 17 are all of the same shape and size, for example are circular holes having a diameter that is equal to 0.15 mm, the holes 13a of the filtering wall 13 are all of the same shape and size, for example they are circular holes having a size equal to 0.3 mm, and the dispensing hole 8 is a circular hole with a diameter that is equal to 0.4 mm.

More in general, with reference to a coffee machine that provides infusion performed at pressure comprised between 8 and 10 bar, preferably 9 bar, and a coffee flow rate comprised between 1.8 and 2.2 grams/second, preferably 2 grams/second, it was advantageous to use holes 17b of the filtering element 17 having a diameter of 0.15 mm+/−0.03 mm, holes 13a of the filtering wall 13 having a diameter of 0.3 mm+/−0.03 mm, and dispensing hole 8 having a diameter equal to 0.4 mm+/−0.05 mm.

The filtering element 17 comprises, in addition to the drilled wall 17a formed in particular by a flat drilled sheet that overlaps the dispensing hole 8, also a spacer 17c that separates the drilled wall 17a from the bottom wall 7 of the cup-shaped body 6.

The flat drilled sheet is specifically formed by a circular disc and the spacer 17c is formed by a ring that extends coaxially from the perimeter edge of the disc.

The ring and the disc can be fixed reciprocally in any manner and can be made as a single piece.

The conformation of the protective filtering element 17 can be different from the conformation illustrated, for example the filtering element 17 can be formed by a spherical shell centred on the dispensing hole 8 and having a uniform distribution of holes over the entire surface thereof, or by a drilled element of any other suitable shape for protecting the dispensing hole 8, leaving a separating distance between the holes of the drilled element and the dispensing hole 8.

Preferably, as shown, the bottom wall 7 of the cup-shaped body 6 is concave and has the dispensing hole 8 centrally.

The dispensing hole 8 is located in the centre of a central dip 18 of the bottom wall 7 of the cup-shaped body 6 where the protective filtering element 17 is completely housed.

The protective filtering element 17 does not interfere with the normal path of the infused coffee in the filter 6, 13 because it is not bulky and is located inside the dispensing hole 8, as the distance of the perimeter edge of the dip 19 from the dispensing hole 8 is noticeably less than the distance of the perimeter edge of the dip 19 from the perimeter edge of the bottom wall 7 of the cup-shaped body 6.

In one the solution, not shown, the filtering element 17 is fixed to the bottom wall 7 of the cup-shaped body 6.

Figure 6:
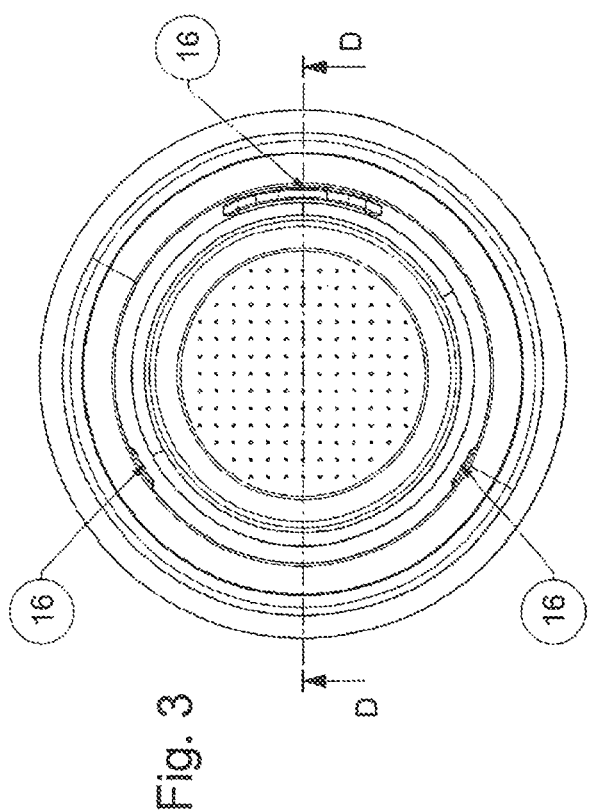
FIG. 6 shows an enlarged detail of the filter of FIG. 5.

In another efte solution, shown in at least FIGS. 5 and 6, that is nevertheless not shown, the filtering element 17 can be fixed to the filtering wall 13 above.

The filter thus conceived is susceptible of numerous modifications and variants falling within the scope of the inventive concept; moreover, all the details are replaceable by technically equivalent elements.

In practice, the materials used, as well as the dimensions, can be any according to the needs and the state of the art.

The invention claimed is:

1. A filter (6, 13) for a filter holder cup (2) of a coffee machine, comprising:
   a cup body (6) having a bottom wall (7) provided with a dispensing hole (8) for dispensing infused coffee; and
   a side wall (9) that bounds a compartment (10) with said bottom wall (7), inside said compartment (10) a separating filtering wall (13) being further positioned between an upper housing chamber (14) housing coffee powder and a lower dispensing chamber (15) comprising said dispensing hole (8) and configured to dispense the infused coffee,
   wherein an inside of said dispensing chamber (15) includes a filtering element (17) configured to protect said dispensing hole (8), where said filtering element (17) is fixed to said filtering wall (13).

2. The filter (6, 13) for a filter holder cup (2) of a coffee machine according to claim 1, wherein said filtering element (17) divides said lower dispensing chamber (15) into a sub storage chamber (15a) of unfiltered infused coffee and a dispensing sub chamber (15b) of filtered infused coffee comprising said dispensing hole (8).

3. The filter (6, 13) for a filter holder cup (2) of a coffee machine according to claim 1, wherein said filtering element (17) has at least one wall (17a) provided with a plurality of through holes (17b).

4. The filter (6, 13) for a filter holder cup (2) of a coffee machine according to claim 3, wherein said filtering wall (13) has a plurality of through holes (13a) and the holes (17b) of said wall (17a) of said filtering element (17) are smaller than said holes (13a) of said filtering wall (13).

5. The filter (6, 13) for a filter holder cup (2) of a coffee machine according to claim 3, wherein said wall (17a) provided with said plurality of through holes (17b) of said filtering element (17) surmounts at a distance from said dispensing hole (8).

6. The filter (6, 13) for a filter holder cup (2) of a coffee machine according to claim 1, wherein said filtering wall (13) has a perimeter gasket (13c) removably engaging with said cup-shaped body (6).

7. The filter (6, 13) for a filter holder cup (2) of a coffee machine according to claim 1, wherein said filtering wall (13) is fixed permanently to said cup-shaped body (6).

8. The filter (6, 13) for a filter holder cup (2) of a coffee machine according to claim 4, wherein said holes (17b) of the filtering element (17) are 0.15 mm+/−0.03 mm in diameter, said holes (13a) of the filtering wall (13) are 0.3 mm+/−0.03 mm in diameter, and said dispensing hole (8) is 0.4 mm+/−0.05 mm in diameter.

9. A filter holder cup (2) for a coffee machine comprising a filter (6, 13) according to claim 1.

10. A coffee machine that operates at an infusion pressure comprised between 8 and 10 bar, dispenses a flow rate of infused coffee comprised between 1.8 and 2.2 grams/second, and comprises a filter holder cup (2) according to claim 9.

* * * * *

UNITED STATES PATENT AND TRADEMARK OFFICE
CERTIFICATE OF CORRECTION

PATENT NO. : 11,638,498 B2
APPLICATION NO. : 16/927064
DATED : May 2, 2023
INVENTOR(S) : Giovanni Rossetto and Maurizio Casasola Page 1 of 1

It is certified that error appears in the above-identified patent and that said Letters Patent is hereby corrected as shown below:

In the Specification

Column 5, Line 61: "In one the solution, …" - delete "the"
Column 5, Line 63: "In another efte solution, …" - delete "efte"
Column 5, Line 64: delete "that is nevertheless not shown"

Signed and Sealed this
Twenty-seventh Day of June, 2023

Katherine Kelly Vidal
*Director of the United States Patent and Trademark Office*